United States Patent
Marsh

[15] 3,660,035
[45] May 2, 1972

[54] METHOD AND APPARATUS FOR DETERMINATION OF HYDROGEN SULFIDE IN HYDROGEN SULFIDE PETROLEUM PRODUCTS

[72] Inventor: Robin S. Marsh, Box 1363 c/o Aramco, Dhahran, Saudi Arabia
[22] Filed: Mar. 26, 1969
[21] Appl. No.: 810,604

[52] U.S. Cl. ............... 23/230 R, 23/253 R, 204/195
[51] Int. Cl. ............... B01k 3/00, G01n 31/16
[58] Field of Search ............... 23/230, 253; 204/195 F, 195 G

[56] References Cited

UNITED STATES PATENTS 2,989,377   6/1961   Leisey ............... 23/230

Primary Examiner—Morris O. Wolk
Assistant Examiner—R. M. Reese
Attorney—McLean, Boustead & Sayre

[57] ABSTRACT

A method for the rapid and accurate determination of the hydrogen sulfide content of a liquid petroleum hydrocarbon. The hydrogen sulfide in a known quantity of said hydrocarbon is dispersed into an ionic state and titrated with a standard cadmium salt solution to determine the hydrogen sulfide content of the hydrocarbon. A hydrogen sulfide analyzer for carrying out the method is also disclosed.

11 Claims, 1 Drawing Figure

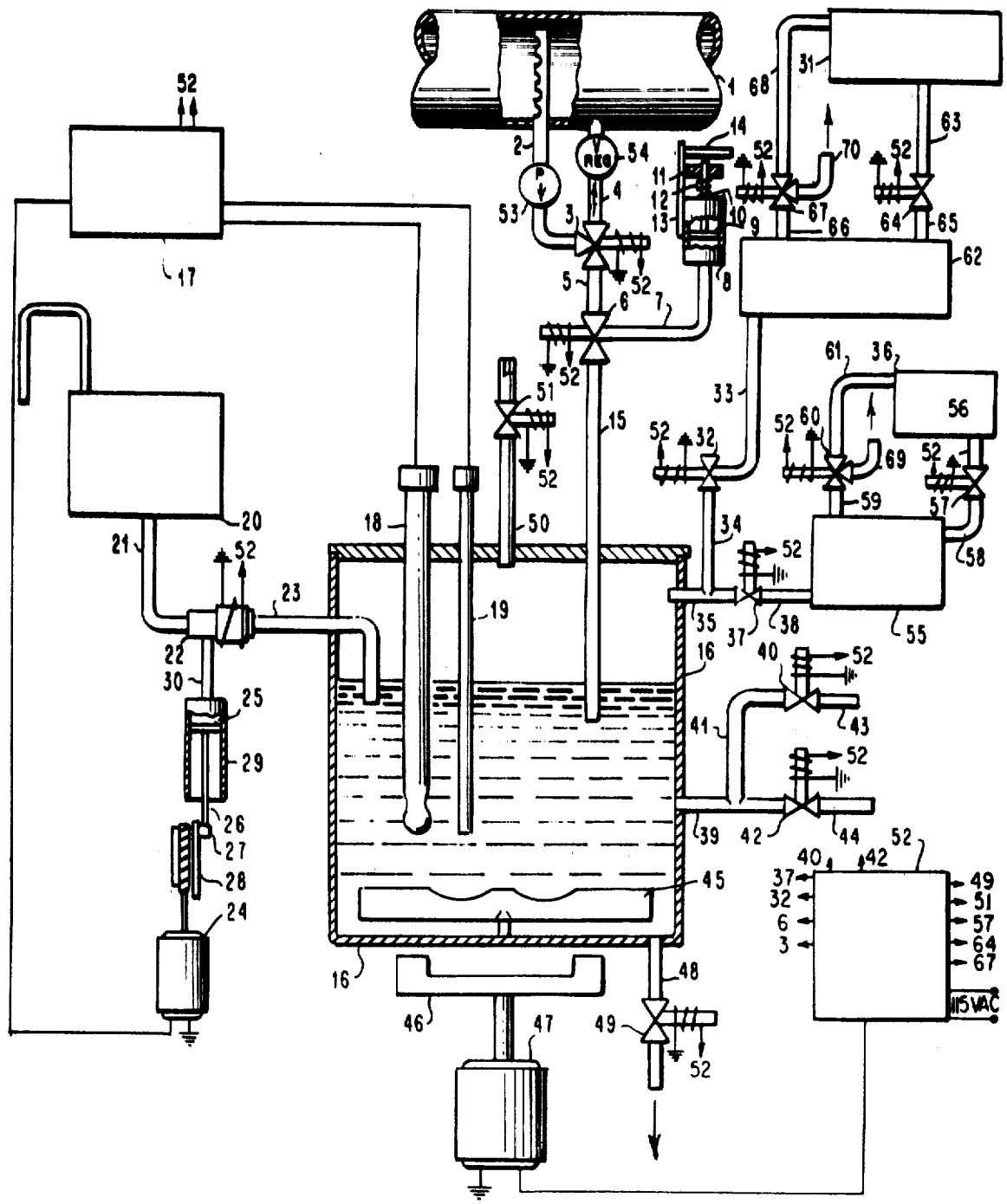

3,660,035

METHOD AND APPARATUS FOR DETERMINATION OF HYDROGEN SULFIDE IN HYDROGEN SULFIDE PETROLEUM PRODUCTS

BACKGROUND OF THE INVENTION

1. Field of the Invention

This invention relates to the titration of liquid petroleum hydrocarbons to determine the hydrogen sulfide content thereof, and more particularly, to a method and analyzer for the automatic and continuous titration of such hydrocarbons.

2. Description of the Prior Art

Hydrogen sulfide is present in crude oil in varying proportions depending upon the source of the crude oil. Because of the well known undesirable characteristics of hydrogen sulfide, e.g., its corrosiveness, toxicity and distasteful smell, crude oil limits for hydrogen sulfide, as low as 70 parts per million, have been established. Therefore, the crude oil used for refining is monitored for hydrogen sulfide content. At present, two basic analytical methods are employed for the analysis of hydrogen sulfide in crude petroleum. One method employs volumetric techniques and, although quite accurate, is time-consuming and requires special training of refinery operators. In this procedure the hydrogen sulfide in the crude is stripped with nitrogen and converted to cadmium sulfide by reaction with, for example, cadmium sulfate solution. The sulfide precipitate is acidified in the presence of a measured volume of standard iodate solution and the excess iodine is titrated with standard sodium thiosulfate solution, for example. The inadequacies of this method become critically apparent at those times when refining units are calling for a large number of hydrogen sulfide analyses to fulfill their need to operate effectively. This procedure is not adaptable to such situations because it is too time-consuming.

Another method of determining the hydrogen sulfide content of petroleum distillates is the silver nitrate potentiometric titration procedure, also commonly used to analyze hydrogen sulfide and mercaptan bearing liquified petroleum gas (LPG). In this method the sample is dissolved in a titration solvent and titrated electrometrically with silver nitrate solution, using a calomel reference electrode and a silver indicating electrode. Under these conditions, hydrogen sulfide is precipitated as silver sulfide and the mercaptan is precipitated as silver mercaptide. The potential at which inflection points occur identify the type of sulfur compounds present. The volume of titrant consumed at these inflection points indicate their concentration. A major problem inherent in this procedure is inadequate extraction of the hydrogen sulfide from the crude oil before the actual hydrogen sulfide content determination (by silver nitrate titration). The method is also time-consuming. Furthermore, interference of other sulfur compounds such as carbonyl sulfide or the mercaptans are believed to be a large source of error. For example, crude oils bearing high levels of mercaptans give variable hydrogen sulfide content results because the mercaptans interfere with the silver nitrate-hydrogen sulfide equilibrium point to the extent that a proper slope cannot be obtained.

There is a need, therefore, for a new method for determining the hydrogen sulfide content of crude petroleum which is simple to operate and provides a rapid and accurate determination of hydrogen sulfide content which is not affected by the presence of other sulfur compounds and anions, and that is adaptable to field operation. It is a primary object of my invention to provide such a procedure.

SUMMARY OF THE INVENTION

My invention provides a novel method for the determination of the hydrogen sulfide content of liquid petroleum hydrocarbons such as crude and refined petroleum, naptha, kerosene or similar petroleum products, involving direct titration of hydrogen sulfide in the hydrocarbon sample in the presence of other sulfur compounds and anions, such as mercaptans and chlorides. By "direct titration" is meant without the removal of the hydrogen sulfide as in prior methods. My method involves titrating, with standard cadmium chloride solution, a PH from about 5 to about 9 buffered mixture of (1) an electrolyte producing solvent which disperses the hydrogen sulfide into an ionic state and (2) a known quantity of the petroleum product. I prefer to autotitrate potentiometrically using a silver sulfide-glass electrode system.

My invention provides a rapid and accurate method for monitoring hydrogen sulfide content and is easy to learn and operate. It does not require time-consuming extraction of the hydrogen sulfide from the hydrocarbon sample and is unaffected by varying sulfur compound impurities, such as the high mercaptan content of whole Arabian crude oils. My method thus avoids the major problem inherent in existing procedures, such as inadequate extraction or separation of sulfide and interference from mercaptans and volatilization losses. The simplicity of my system makes it easily adaptable by simple mechanical modification to use as a field monitoring unit.

DETAILED DESCRIPTION OF THE INVENTION

In accordance with my invention there is provided a method for the determination of the hydrogen sulfide content of a petroleum hydrocarbon which comprises mixing a solvent, which disperses the hydrogen sulfide in the petroleum hydrocarbon into an ionic state, a known quantity of said petroleum product, and a buffer to maintain the mixture at a pH selected from a range of from about 5 to about 9 (cadmium mercaptans precipitate above a pH of about 9 and $H_2S$ escapes very quickly from aqua solutions in the concentrations encountered herein below a pH of about 5), and then titrating the mixture with a standard cadmium chloride solution (e.g., 0.050N) to determine the hydrogen sulfide content of the hydrocarbon.

In a preferred embodiment of my invention I add crude oil to a buffered solvent preferably a mixture of isopropyl alcohol and toluene, and titrate with standard cadmium chloride solution electrochemically using a silver sulfide-glass electrode system. I have found that the use of toluene with the alcohol solvent prevents the coating of the glass and sulfide electrodes with asphaltenes and other crude undissolvables. I have found that the use of a buffer to buffer the hydrocarbon-solvent solution to pH 7 prevents hydrogen sulfide from escaping and precipitating cadmium mercaptides during titration, stabilizes the hydrogen ion effect upon the glass reference electrode during potentiometric titration and prevents drifts in the recorded EMF curve. It also improves the EMF/V change or slope at the precipitation point of cadmium sulfide. In other words it causes the reaction to reach equilibrium very quickly within the system. However a pH range of from about 5 to about 9 can be employed.

The accuracy of ml. method was determined by comparison with a conventional potentiometric procedure using regular sulfide bearing crude oil samples. Table I shows the results of my method and the nitrogen sweep-cadmium sulfate-iodimetric titration as determined by paralleling the laboratory work as described below. 50 m. of hydrogen sulfide free kerosene was added to the nitrogen sweep sample scrubber vessel while 100 ml. of sample was pipetted from the middle of the crude oil sample container. This sample portion was added to the scrubber vessel by placing the fast draining pipette tip below the surface of the kerosene and immediately closing the vessel. In rapid order 50 ml. of crude oil was then pipetted from the same sample container and transferred in identical manner to the potentiometric vessel containing the buffered toluene-isopropyl alcohol solvent and titration begun. This pipetting procedure was subsequently abandoned when it was found that transference by a 50 ml. hypodermic syringe fitted with a laboratory fabricated large bore 6 inch long needle gave higher and more consistent results. The comparison tests were consequently repeated using the syringe to transfer the samples in both procedures. The results of the tests in Table I show that the syringe had a definite effect in minimizing vaporization losses at high hydrogen sulfide levels. These tests were run on duplicate samples taken from the units at the same time that the pipette test samples were taken since it was anticipated that frequent opening of containers would cause significant hydrogen sulfide losses at high hydrogen sulfide levels.

TABLE I

Comparison of Hydrogen Sulfide in Petroleum Samples Using Potentiometric Auto-Titration and Nitrogen Sweep-Cadmium Sulfate-Iodimetric Titration

| Type of petroleum | sample number | Hydrogen sulfide in parts per million | | | |
|---|---|---|---|---|---|
| | | Pipette Transfer | | Syringe Transfer | |
| | | Nitrogen sweep | Auto titration | Nitrogen sweep | Auto titration |
| arab light crude | 1 | 0 | 0 | 0 | 0 |
| | 2 | 13 | 13 | 13 | 12 |
| | 3 | 30 | 31 | 37 | 36 |
| | 4 | 49 | 51 | 54 | 56 |
| | 5 | 55 | 54 | 57 | 56 |
| | 6 | 62 | 65 | 68 | 70 |
| | 7 | 68 | 70 | 78 | 80 |
| | 8 | 97 | 97ᵃ | 113 | 112ᵃ |
| | 9 | 105 | 111ᵃ | 133 | 135ᵃ |
| | 10 | 118 | 123ᵃ | 153 | 151ᵃ |
| arab medium crude | 11 | 17 | 18 | 17 | 19 |
| | 12 | 24 | 26 | 26 | 24 |
| | 13 | 60 | 65 | 69 | 68 |
| | 14 | 90 | 94ᵃ | 114 | 112ᵃ |
| | 15 | 123 | 119ᵃ | 163 | 165ᵃ | a—25 ml. of sample tested.

Any standard buffer system can be employed as, for example, those disclosed in Handbook of Chemistry, Lange, 10th Ed. McGraw Hill (1961) and Handbook of Chemistry & Physics, 43rd Ed. (1961). Exemplary of such buffer systems are: pH of 5 buffer − 23.85 ml 0.1 N NaOH + 50 ml 0.1 m $KHC_8H_4O_4$ diluted to 100 ml; pH of 7 buffers − 29.63 ml 0.1 N NaOH + 50 ml 0.1 m $KH_2PO_4$ diluted to 100 ml, and Beckman's pH 7 concentrated buffer can be used when diluted to 25 volumes; pH of 9 buffer − 23.30 ml 0.1 N NaOH + 50 ml 0.1 m $H_3BO_3$ diluted to 100 ml; 50 ml 0.025 m Borax + 4.6 ml 0.1 m HCl, and Beckman's pH 9 concentrated buffer can be used when diluted to 25 volumes.

The ionizing solvents that can be used are exemplified by low molecular weight alcohols, with butanols being the maximum molecular weight, mixed with aromatic compounds, preferably containing six to about eight carbons. Neither will work alone. Exemplary of such alcohols are ethanol, isopropanol, n-propanol, n-butanol, and methanol. Isopropanol and ethanol are preferred with arabian crudes. Toluene, benzene and xylenes typify the aromatics. Toluene and benzene gave the best curves and left and electrode cleaner than the xylenes. I prefer to use the solvent mixture in a ratio of from 1:5 to 1:1 of aromatic to alcohol, and preferably about 1:4 to achieve the best break in the titration curve.

The present invention will be more clearly understood by reference to the following detailed description, read in conjunction with the accompanying schematic drawing of the major components of a field monitoring apparatus, which in operation illustrates the method of this invention and is equally applicable to refinery operations.

Referring to FIG. 1, the liquid stream being monitored from the plant-stream or pipe line source 1 is passed through pump 53 via crude sample line 2 (containing, in the segment projecting into the pipe line, inlet perforations on the side facing upstream to the flow) to double solenoid valve 3. For purposes of this detailed description only and not by way of limitation, the stream being monitored is assumed to be a crude oil stream and hence the labeling on FIG. 1 "crude oil line." Valve 3 is connected to crude oil line 1 by means of crude return line 4 having a pressure regulator valve 54 inserted thereon. Valve 3 is also connected to double solenoid valve 6 by means of line 5. Valve 6 is connected to crude measuring cylinder 8 by means of line 7. Typically, crude measuring cylinder 8 has a maximum volume capacity of 50 ml. Plunger head 9 is slidably fitted through horizontal support 11. Coil spring 12 is circumferentially and rigidly mounted on plunger stem 10. Crude measuring cylinder 8 has mounted thereon vertical support 13. To vertical support 13 is rigidly mounted horizontal support 11 which is positioned over the upper end of cylinder 8. Crude volume adjuster 14 is adjustably mounted on the upper end of vertical support 13 and serves as an adjustable stop for the intake stroke of plunger stem 10. It should be noted that plunger stem 10 is loosely fitted within crude measuring cylinder 8 to permit venting upon the upward or intake stroke of the plunger head 9. Pump 53 and pressure regulator valve 54 give a pressure differential between intake of line 2 and outlet of line 4 so that the fluid will flow from intake of line 2 to outlet of line 4. The pump discharge pressure shall be more than the pressure required to raise the plunger head 9. The pressure regulator valve shall be set so the back pressure on plunger head 9 will be greater than the pressure required to raise plunger head 9. The pressure exerted by plunger head 9 must be greater than the vapor pressure of crude oil sample being measured otherwise there will be a vapor space in the measuring cylinder 8. The vapor pressure will vary with types and temperature of crude oils. This is the reason that horizontal support 11 is made to slide so the tension of coil spring 12 can be adjusted to have the pressure on plunger head 9 greater than the vapor pressure of the liquid to be measured. Line 15 is connected at one terminus to valve 7 and at the other terminus extends far enough into the interior of cylinder 16 to be below the sample volume line (a line determined by the volume of the crude measuring cylinder 8). Cylinder 16 is typically a closed plastic vessel, e.g., polypropylene or polyethylene, or a glass container, the first being assumed in this example. The potentiometric recorder 17 is typically a "Potentiograph E-336A" produced by Metrohm Ltd., 9100 Herisau, Switzerland, electrically connected to glass electrode 18 which is positioned in cylinder 16 in such manner to permit the lower portion thereof to extend below the minimum liquid operating level. Typically, glass electrode 18 is a Beckman glass electrode, operable over pH range of 1 to 11 and a solution temperature range of −5° to 80° C. Silver sulfide electrode 19, electrically connected to potentiometer 17, is positioned in a similar manner. Typically, silver sulfide electrode 19 has a length of 6 centimeters and a diameter of 3 millimeters. As will appear more fully hereinafter, in operation a fresh silver sulfide coating is prepared prior to penetration. Reservoir 20 contains a standard cadmium chloride solution (0.050N) and is connected to valve 22 (a double action solenoid valve) by means of line 21. Line 23 extends from valve 22 through the wall of cylinder 16 at a point above the maximum fluid operating level and typically terminates at a point below the minimum fluid operating level in order to obviate any splashing upon the electrodes, which would cause titration inaccuracies. Electric motor 24 is electrically connected with potentiometer 17 and is interconnected with plunger head 25 via plunger stem 26 which is pivotally hinged to pin 27 located on plate 28. Plunger head 25 is located in cylinder 29. The upper interior chamber of cylinder 29 is connected with valve 22 by means of line 30. The upper interior chamber of cylinder 29 typically has a maximum volume capacity of 10 ml. and is graduated in such a manner that the amount of cadmium chloride present at any time can be visually determined. Reservoir 31 is connected to valve 64 (a single action solenoid valve) by means of line 63. Valve 64 opens into measuring cylinder 62 via line 65. Double action solenoid valve 67 connects vent line 68, which is connected to reservoir 31, and open vent line 70 to measuring cylinder 62 via line 66. Measuring cylinder 62 is connected to line 35 by means of lines 33 and 34, the latter two being connected by single action solenoid valve 32. Line 35 projects into cylinder 16 at a point above the maximum fluid operating level. Reservoir 31 contains a buffer having a pH range from 5–9, and typically a pH 7 buffer, which is assumed for the purposes of this example, consisting of monopotassiumphosphate and sodium hydroxide.

Reservoir 36 is connected to valve 57 (a single action solenoid valve) by means of line 56. Valve 57 opens into measuring cylinder 55 via line 58. Double action solenoid valve 60 interconnects vent line 61 (which is connected to reservoir 36) and open vent line 69 with measuring cylinder 55 via line 59. Measuring cylinder 55 is connected to line 35 by means of line 38 through single action solenoid valve 37. Reservoir 36 contains an ionizing solvent for hydrogen sulfide which typically is isopropyl alcohol. In addition, reservoir 36 contains toluene. The mixture is present in a proportion of one volume toluene to four volumes isopropyl alcohol. Wash toluene and wash water are introduced into cylinder 16 via line 39. Wash toluene comes into line 39 through valve 40 and line 41 and the wash water through valve 42. Both valves are single action solenoid valves which are connected by lines 43 and 44 to a toluene storage tank and a water line, respectively. Magnetic stirrer 45 is positioned in the bottom of cylinder 16. Magnet 46 operates in conjunction with stirrer 45 and is propelled by motor 47 physically located outside of cylinder 16. Line 48 serves as a drain for cylinder 16. Valve 49 (a single action solenoid valve) is located on line 48. Line 50 serves as a vent for cylinder 16. Valve 51 (a single action solenoid valve) is located on line 50.

The sequence of operations of the apparatus shown in the figure is controlled by an electrically powered cam timer 52 of conventional design and containing a series of cams with associated switches. All valves and motors as well as potentiometer 17 are controlled by the various switches which in turn are controlled by their respective associated cams. The circuitry interconnecting the switches with the respective valves, motors and potentiometer elements is conventional.

SEQUENCE OF OPERATIONS

The following program will exist as the complete cycle as programmed on cam timer 52 begins, because the end of cycle will have left the apparatus in this position. Double solenoid valve 3 is in position to allow crude oil to be pumped by pump 53 from line 2 to line 4 and line 5 is closed. Double solenoid valve 6 is in position that line 5 is open to line 7 and closed to line 15. Single solenoid valve 37 is closed. Single solenoid valve 57 is open. Double solenoid valve 60 is in position that line 59 is open to vent line 61 and closed to open vent line 69. Thus measuring cylinder 55 is full of isopropanol-toluene mixture from reservoir 36. Single solenoid valve 32 is closed. Single solenoid valve 64 is open. Double solenoid valve 67 is in position that line 66 is open to vent 68 and closed to open vent line 70. Thus measuring cylinder 62 is full of pH 7 buffer solution from reservoir 31. Titration chamber 16 is full of distilled water with single solenoid valves 51 and 49 closed. Double solenoid valve 22 is in position that line 30 is open to line 21 and closed to line 23. Plunger head 25 is in down position of stroke in cylinder 29. Thus cylinder is full of cadmium chloride standard solution from reservoir 20. Two way switch for motor 24 is in clockwise position but not energized.

The following description uses elapse time in seconds as the guide for sequence of cam operation.

| Elapse Time | Description of operation |
|---|---|
| 0 seconds | Cam timer 52 is started. (The timer can be set to repeat operation to any interval of time greater than one complete rotation of the cam.) |
| 5 seconds | Single solenoid 51 is actuated to open open-vent line 50. Single solenoid 49 is actuated to open drain line 48. Thus distilled water will drain from titration chamber 16. |
| 30 seconds | Double solenoid 3 is actuated to close line 4 and open line 2 to line 5 thus filling the measuring cylinder 8 through line 7 by raising plunger head 9 with pressurized crude oil to quantity set by slide 14. Single solenoid 49 is actuated to close drain line 48. All distilled water drained from chamber 16. Double solenoid 3 is actuated to open line 2 to line 4 and close to line 5 thus letting crude oil return to line 1 after cylinder 8 has been filled with sample. Single solenoid 64 is actuated to close line 63 to line 65. Single solenoid 57 is actuated to close line 56 to line 58. Double solenoid 67 is actuated to open line 66 to open vent line 70 and close to return vent line 68. |
| 35 seconds | Single solenoid 32 is actuated to open line 33 to lines 34 and 35 to let 20 ml. of pH buffer drain from measuring cylinder 62 to titration chamber 16. Double solenoid 60 is actuated to open line 59 to open vent line 69 and close return vent line 61. Single solenoid 37 is actuated to open line 38 to line 35 to let 100 ml. of isopropanol-toluene mixture drain from measuring cylinder 55 to titration chamber 16. |
| 45 seconds | Motor 47 is actuated thus causing magnet 46 to rotate stirrer 45. |
| 50 seconds | Single solenoid valve 32 is closed. |
| 60 seconds | Single solenoid valve 37 is closed. Double solenoid 67 is actuated to open line 66 to return vent line 68 and close open vent line 70. Double solenoid 60 is actuated to open line 59 to return vent line 61 and close open vent line 69. Single solenoid valve 64 is opened. Single solenoid valve 57 is opened. Single solenoid valve 51 is closed. Double solenoid 6 is actuated to open line 7 to line 15 and close line 5. Thus crude oil from measuring cylinder 8 is drained to titration chamber 16. |
| 65 seconds | Potentiometer 17 is actuated to measure initial E.M.F. of cell of electrodes 18 and 19 in titration chamber 16. |
| 70 seconds | Double solenoid 6 is actuated to open line 5 to line 7 and close line 15. Double solenoid 22 is actuated to open line 30 to line 23 and close line 21. Clockwise switch of motor 24 is energized to begin titration. |
| 75 seconds | Potentiometer 17 and titration motor 24 are actuated. The linear distance the potentiometer chart travels is proportional to the volume of cadmium chloride solution displaced by upward movement of piston head 25 in cylinder 29. |
| 80 seconds | The titration rate is set to deliver 5 ml. per minute by speed control of motor 24. The rate of titration is changed to 1 ml. per minute by actuating switch to change speed of motor 24. This speed change control switch is actuated by the movement of pin 27. This switch is set to change the rate of titration from 5 ml./minute to 1 ml./minute at approximately 20 p.p.m. of $H_2S$ below the anticipated content of $H_2S$ in crude oil sample. [Example: The crude oil of |
| 85 seconds | |

| | |
|---|---|
| | 33°API gravity had approximately 120 p.p.m. of H₂S concentration (1 ml. of standard 0.050N CdCl₂ solution = 20 p.p.m. of H₂S in 50 ml. crude sample). In this case the speed control switch would be set to be actuated by pin 27 to change the titration rate when 5 ml. of cadmium chloride solution had been delivered to titration chamber 16 from cylinder 29. Capacity of cylinder 29 = 10 ml. The cam timer 52 is stopped at the beginning of titration because the timing of the titration depends on the H₂S content which in turn positions the speed control titration rate switch to be actuated by 27. The time of the titration would be 6 minutes for above example.] |
| 6 minutes 85 sec. | Cam timer 52 energized. Motor 24 two-way switch is tripped to counterclockwise position but not energized. Chart drive clutch is released. Potentiometer 17 is switched to off EMF position—zero position. |
| 6 minutes 90 sec. | Single solenoid 51 is actuated to open vent line 50. Single solenoid 49 is actuated to open drain line 48 to drain contents from chamber 16. |
| 6 minutes 95 sec. | Double solenoid 22 is actuated to open line 21 to line 30 and close line 23. Counterclockwise switch is energized to start motor 24 to draw down plunger head 25 filling cylinder 29 with standard cadmium chloride from reservoir 20 through lines 21 and 30. When filled, motor 24 two-way switch is tripped to clockwise position but not energized. |
| 6 minutes 120 sec. | Single solenoid 40 is actuated to open line 43 to lines 41 and 39. Line 43 is connected to a toluene reservoir. The spray of toluene from line 39 washes electrodes 18 and 19 and chamber 16 of oily residue remaining after draining titrated contents. |
| 6 minutes 140 sec. | Single solenoid valve 40 is closed. |
| 6 minutes 160 sec. | Single solenoid 42 is actuated to open line 44 to line 39. Line 44 is connected to distilled water reservoir. The spray of distilled water from line 39 washes electrodes 18 and 19 and chamber 16 of water soluble residue remaining after the toluene wash. |
| 6 minutes 200 sec. | Single solenoid valve 49 is closed. Stirring motor 47 is switched off. |
| 6 minutes 220 sec. | Single solenoid valve 51 is closed. Single solenoid valve 42 is closed. |
| 6 minutes 230 sec. | Actuate switch to start cam timer 52 clock. |
| **6 minutes 240 sec. | Stop cam timer. |

Glass electrode 18 is cleaned, as needed, by dipping it into an iodine solution for a few minutes, followed by rinsing well with distilled water. Washing the glass electrode with toluene followed by distilled water prolongs the interval between cleanings. The duration of such interval varies with the type of product being tested. The iodine solution is about 0.1N and contains two grams of potassium iodide per 100 ml water. Care should be taken to prevent contact of this solution with silver sulfide electrode 19. Periodically, a fresh silver sulfide electrode 19 should be prepared when the electrode stops producing a steep break at the equilibrium point, as depicted upon the potentiometer. Such a fresh coating is prepared in the following manner:

Burnish two electrodes with No. 00 fine emery cloth until a clean polished silver surface shows; immerse the polished electrodes in 35 percent nitric acid solution; remove the electrodes when the appearance of the silver is paper white; rinse them with distilled water; immerse the freshly acid-cleaned electrodes in 100 ml of 10 percent NaOH solution containing about 0.5 gram of sodium sulfide in solution (do not allow the electrodes to contact each other); momentarily contact the electrode lead ends to a 1.5 volt battery terminal (the lead of the electrode selected for sulfide coating should contact the positive terminal); alternate the polarity of the electrodes a few times using momentary contacts of leads to terminals; hold the leads against the battery terminals, with the electrode selected for use at the positive terminal, until the electrode has a black deposit on its entire surface; rinse the sulfide coated electrode with distilled water; and store the electrode in distilled water when it is not being used in titration. A proper thickness of sulfide coating will adhere firmly and give a steep break in the titration curve.

The hydrogen sulfide content of the sample can be calculated from the following formula:

$$H_2S, \text{p.p.m. by weight} = \frac{T \times N \times 0.017 \times 10^6}{V \times D}$$

Where
$T$ = ml of cadmium chloride solution,
$N$ = normality of cadmium chloride,
$V$ = volume of sample taken, ml
$D$ = density of sample at room temperature. Take the inflection point of the titration curve as the end point. The graphical method should be used for locating the midpoint.

The approximation: $H_2S$, ppm by weight = ml of 0.050 N cadmium chloride X 20 (1 division on the chart paper scale = 1 ppm) is valid for Arabian Light and Medium crude oils. A density of 0.86°–33° API - has been used to arrive at the above formula. The above formula is valid for 50 ml sample size.

The value for repeatability is ± 2 ppm for samples of Arabian crude oils within the 0 to 150 ppm H₂S range.

I claim:

1. A method for the determination of the hydrogen sulfide content of a liquid petroleum hydrocarbon which comprises mixing a solvent, which disperses the hydrogen sulfide in the petroleum product into an ionic state, a known quantity of the petroleum hydrocarbon, and a buffer to maintain the mixture at a pH from about 5 to about 9, and titrating the mixture with a standard cadmium salt solution to determine the hydrogen sulfide content of the hydrocarbon.

2. The method of claim 1 wherein the solvent is a mixture of a lower aliphatic alcohol of one to four carbon atoms and an aromatic compound selected from the group consisting of toluene benzene and xylene.

3. The method of claim 1 wherein the solvent is a mixture of toluene and an aliphatic alcohol.

4. The method of claim 1 wherein the solvent is a mixture of toluene and ethyl alcohol.

5. The method of claim 1 wherein the solvent is a mixture of toluene and isopropyl alcohol.

6. The method of claim 1 wherein the hydrogen sulfide content of the petroleum product is from about 0 to about 150 parts per million.

7. The method of claim 1 wherein the equivalence point is determined potentiometrically using a silver sulfide-glass electrode system.

8. The method of claim 1 wherein the pH is maintained at about 7.

9. The method of claim 8 wherein the buffer comprises monopotassium phosphate and sodium hydroxide.

10. A hydrogen sulfide analyzer comprising a closed titration chamber, having inlet and outlet means, means for potentiometrically measuring the hydrogen sulfide content by titration using a standard cadmium salt solution; a plurality of flow means for introducing to said titration vessel: (1) a measured stream of petroleum hydrocarbon containing hydrogen sulfide for analysis, (2) a stream of buffer solution, (3) a stream of solvent suitable for dispersing the hydrogen sulfide into an ionic state in said hydrocarbon, (4) an aqueous wash stream, and (5) a measured stream of said standardized cadmium solution; and a means for stirring fluids in said titration chamber.

11. The analyzer of claim 10 wherein said means for potentiometrically measuring the hydrogen sulfide content comprises a recording potentiometer and a silver sulfide-glass electrode system wherein the ionic sulfide is titrated with a standard cadmium chloride solution.

* * * * *